US008782722B1

(12) United States Patent
Kellicker

(10) Patent No.: US 8,782,722 B1
(45) Date of Patent: Jul. 15, 2014

(54) DECODING OF CLOSED CAPTIONS AT A MEDIA SERVER

(71) Applicant: Wowza Media Systems, LLC, Evergreen, CO (US)

(72) Inventor: Scott Kellicker, Worthington, OH (US)

(73) Assignee: Wowza Media Systems, LLC, Evergeen, CO (US)

( * ) Notice: Subject to any disclaimer, the term of this patent is extended or adjusted under 35 U.S.C. 154(b) by 0 days.

(21) Appl. No.: 13/857,572

(22) Filed: Apr. 5, 2013

(51) Int. Cl.
*H04N 7/10* (2006.01)
*H04N 7/173* (2011.01)
*H04N 11/00* (2006.01)

(52) U.S. Cl.
USPC ............................ 725/91; 725/32; 348/468

(58) Field of Classification Search
USPC ........................ 725/87, 91, 40, 32; 348/468
See application file for complete search history.

(56) References Cited

U.S. PATENT DOCUMENTS

| 5,347,365 | A | * | 9/1994 | Harigai et al. ............... 348/525 |
| 5,572,260 | A | * | 11/1996 | Onishi et al. ................. 348/460 |
| 6,097,442 | A | | 8/2000 | Rumreich et al. |
| 6,415,100 | B1 | * | 7/2002 | Park ............................... 386/244 |
| 6,961,512 | B1 | * | 11/2005 | Cho ............................... 386/241 |
| 7,272,658 | B1 | | 9/2007 | Edelman et al. |
| 7,587,509 | B1 | | 9/2009 | Edelman et al. |
| 7,617,272 | B2 | | 11/2009 | Bulson et al. |
| 7,961,878 | B2 | | 6/2011 | Whillock et al. |
| 8,010,692 | B1 | | 8/2011 | Shanson et al. |
| 8,015,159 | B2 | | 9/2011 | Boicey et al. |
| 8,051,287 | B2 | | 11/2011 | Shetty et al. |
| 8,065,426 | B2 | | 11/2011 | Edelman et al. |
| 8,205,076 | B1 | | 6/2012 | Shetty et al. |
| 8,245,033 | B1 | | 8/2012 | Shetty et al. |
| 8,284,932 | B2 | | 10/2012 | Whillock et al. |
| 8,285,819 | B2 | | 10/2012 | Pettinato |
| 8,285,867 | B1 | * | 10/2012 | Edelman et al. .............. 709/231 |
| 8,332,530 | B2 | | 12/2012 | Wei et al. |
| 8,392,748 | B2 | | 3/2013 | Bocharov et al. |
| 8,402,504 | B2 | | 3/2013 | Shusman |
| 2002/0154891 | A1 | * | 10/2002 | Kimura et al. .................. 386/68 |
| 2004/0047589 | A1 | * | 3/2004 | Kim .............................. 386/46 |
| 2005/0075857 | A1 | * | 4/2005 | Elcock et al. ..................... 704/2 |
| 2005/0162551 | A1 | | 7/2005 | Baker |
| 2006/0109378 | A1 | * | 5/2006 | Yang et al. .................... 348/465 |
| 2007/0022435 | A1 | * | 1/2007 | Kwon ............................. 725/38 |

(Continued)

FOREIGN PATENT DOCUMENTS

WO 2009052118 A3 4/2009

OTHER PUBLICATIONS

Zencoder; "Captions Embed Closed Captions for Web, Mobile, and OTT"; retrieved on Oct. 4, 2012 from "http://zencodercom/captions/index.html"; 3 pages.

(Continued)

Primary Examiner — James R Sheleheda
(74) Attorney, Agent, or Firm — Toler Law Group, PC

(57) ABSTRACT

Systems and methods of processing closed captions are disclosed. For example, a media server may receive a first video stream and first closed caption data associated with the first video stream. The media server may interpret at least one command included in the first closed caption data to generate interpreted closed caption data. The media server may transmit, to a destination device, a second video stream including second closed caption data that is generated based on the interpreted closed caption data.

20 Claims, 6 Drawing Sheets

(56) References Cited

U.S. PATENT DOCUMENTS

| | | | |
|---|---|---|---|
| 2007/0027844 A1* | 2/2007 | Toub et al. ........................ | 707/3 |
| 2007/0130581 A1* | 6/2007 | Del Sesto et al. ................ | 725/36 |
| 2008/0129864 A1* | 6/2008 | Stone et al. .................... | 348/468 |
| 2009/0022247 A1* | 1/2009 | Kim et al. ....................... | 375/321 |
| 2009/0310021 A1* | 12/2009 | Kondo et al. .................. | 348/564 |
| 2010/0106482 A1* | 4/2010 | Hardacker et al. ................ | 704/3 |
| 2010/0141834 A1 | 6/2010 | Cuttner | |
| 2010/0265397 A1* | 10/2010 | Dasher et al. .................. | 348/468 |
| 2011/0083144 A1 | 4/2011 | Bocharov et al. | |
| 2011/0149153 A1* | 6/2011 | Nam et al. ..................... | 348/468 |
| 2011/0164673 A1* | 7/2011 | Shaffer .................... | 375/240.01 |
| 2011/0302417 A1 | 12/2011 | Whillock et al. | |
| 2012/0023255 A1 | 1/2012 | Edelman et al. | |
| 2012/0102158 A1* | 4/2012 | Ma et al. ....................... | 709/219 |
| 2012/0143606 A1* | 6/2012 | Pham ............................ | 704/235 |
| 2012/0176540 A1* | 7/2012 | Labrozzi et al. .............. | 348/468 |
| 2012/0240172 A1 | 9/2012 | Phillips et al. | |
| 2012/0301111 A1* | 11/2012 | Cordova ........................ | 386/245 |
| 2012/0316860 A1* | 12/2012 | Reitan ............................... | 704/2 |
| 2012/0320267 A1 | 12/2012 | Landow | |
| 2013/0011121 A1 | 1/2013 | Forsyth et al. | |
| 2013/0300929 A1* | 11/2013 | Hines ............................ | 348/468 |

OTHER PUBLICATIONS

National Association of the Deaf; FCC Releases Internet Protocol Captioning Rules; retrieved on Oct. 4, 2012 from "http://transition.fcc.gov/Daily_Releases_Business/2012/db0113/FCC-12-9A1.pdf"; 3 pages.

46632; Federal Register; vol. 77, No. 151; Monday, Aug. 6, 2012; Rules and Regulations; retrieved on Oct. 4, 2012; 2 pages.

Wikipedia; Real Time Messaging Protocol; retrieved on Oct. 3, 2012 from "http://en.wikipedia.org/w/index.php?title=Real_Time_Messaging_Protocol&oldid=515452950"; 10 pages.

Adobe Systems; RTMP Specification License; Apr. 2009; http://www.adobe.com/devnet/rtmp/.; retrieved on Oct. 4, 2012; 70 pages.

Jan Ozer; "Closed Captioning in Wowza Media Server 3.5"; retrieved on Mar. 6, 2013 from http://www.streamingmedia.com/Articles/Editorial/Featured-Articles/Closed-Captioning-in-Wowza-Media-Server-3.5-86350.aspx; 3 pages.

Troy Dreier; "Wowza and Uvault Partner for Live Video Captioning System"; retrieved on Mar. 6, 2013 from http://www.streamingmedia.com/Articles/News/Online-Video-News/Wowza-and-Uvault-Partner-for-Live-Video-Captioning-System-81886.aspx; 2 pages.

"How to configure closed captioning for live streaming" retrieved Mar. 6, 2013 from http://www.wowza.com/forums/content.php?447; 2 pages.

47 CFR 15.119; Code of Federal Regulations; Title 47—Telecommunication, vol. 1, Oct. 1, 2007; "Section 15.119—Closed caption decoder requirements for analog television receivers"; retrieved on Mar. 29, 2013; 13 pages.

"Adobe Media Server 5.0.1—Configure Closed Captioning" retrieved on Mar. 26, 2013 from http://help.adobe.com/en_US/adobemediaserver/devguide/WS52621785137562 06232b27a91396cda04c9-8000.html; 1 page.

Converting SCC to a Readable Format: CCASDI; retrieved on Mar. 26, 2013 from http://www.theneitherworld.com/mcpoodle/SCC_TOOLS/DOCS/SCC_TOOLS.HTML#ccasdi; 19 pages.

"Skylark Enhances Closed Captioning"; retrieved on Mar. 26, 2013 from http://www.skylark.tv/about/news/Skylark_Enhances_Closed_Captioning/; 1 page.

"Sony's Enhanced Solution for Closed Captioning: PDBZ-UPG02 Software Option for the PDW-HD1500/F1600 Recording Decks"; retrieved on Mar. 26, 2013 from http://pro.sony.com/bbsc/ssr/micro-xdcam/resource.solutions.bbsccms-assets-micro-xdcam-solutions-SolutiontoCloseCaptions.html; 1 page.

U.S. Appl. No. 13/652,272l, filed Oct. 15, 2012; entitled "Systems and Methods of Processing Closed Captioning for Video on Demand Content"; 25 pages.

* cited by examiner

300

| CC Data in Platform-Independent Format | |
|---|---|

310

| No. | 1 |
|---|---|
| Text | "JOHN: He should be here any minute." |
| Start Time | 0:19:20.000 |
| End Time | 0:19:22:000 |
| Language | eng |
| Location | <50, 400> |
| Font | Proportional Sans Serif |
| Size | 2 |
| Style | |
| BG Color | Black |
| FG Color | White |
| Passed-through | |

331 — No.
332 — Text
333 — Start Time
334 — End Time
335 — Language
336 — Location
337 — Font
338 — Size
339 — Style
340 — BG Color
341 — FG Color
342 — Passed-through

320

| No. | 2 |
|---|---|
| Text | "[KNOCKING ON THE DOOR]" |
| Start Time | 0:19:21.700 |
| End Time | 0:19:23:700 |
| Language | eng |
| Location | <30, 300> |
| Font | Proportional Sans Serif |
| Size | 2 |
| Style | Italics |
| BG Color | Black |
| FG Color | White |
| Passed-through | |

*FIG. 3*

DECODING OF CLOSED CAPTIONS AT A MEDIA SERVER

BACKGROUND

The popularity of the Internet, coupled with the increasing capabilities of personal/mobile electronic devices, has provided consumers with the ability to enjoy multimedia content almost anytime and anywhere. For example, live (e.g., sports events) and video on demand (VOD) content (e.g., television shows and movies) can be streamed via the Internet to personal electronic devices (e.g., computers, mobile phones, and Internet-enabled televisions).

Broadcast television channels may include one or more closed captioning tracks to make programs more accessible to the hearing impaired. Similarly, movies on digital video discs (DVDs) may include subtitle tracks in multiple languages. However, Internet-accessible content may not be provided with closed captioning. Moreover, the large number of available closed captioning formats makes it difficult to implement closed captioning systems that are compatible with the various electronic devices and platforms available to consumers, even though government regulations may mandate closed captioning for Internet-accessible content. For example, in the United States, the Federal Communications Commission (FCC) has issued a rule entitled "Closed Captioning of Internet Protocol-Delivered Video Programming: Implementation of Twenty-First Century Communications and Video Accessibility Act of 2010." Many providers for streaming video may be concerned with only a specific streaming technology, application, or platform. Thus, a single-platform closed captioning system offered by such providers in response to government regulations may not support a large number of users that use different closed captioning formats and may not scale as new closed captioning formats become popular.

SUMMARY

Systems and methods of decoding and converting closed captions are disclosed. For example, the described decoding and conversion techniques may be performed by a media server with respect to closed captions received in a stream (e.g., a live stream). Closed captions in the stream may be represented in a consumer electronics association (CEA)-608 format. Upon detecting the closed captions in the stream, the media server may decode the closed captions. In one example, decoding the closed captions may include simulating (or emulating) a hardware closed caption decoder using a software decoder executing at the media server. Advantageously, the software decoder may simulate multiple closed caption modes and on-screen/off-screen display memories. The decoded closed captions may be converted into a platform-independent format (e.g., a timed text representation). The data in the platform-independent format may then be converted into a desired output format that is compatible with a streaming protocol to be used to deliver the closed captions (and video stream) to a destination device.

BRIEF DESCRIPTION OF THE DRAWINGS

FIG. 3 is a diagram to illustrate a particular embodiment of a platform-independent closed captioning format that may be used by the system of FIG. 1;

DETAILED DESCRIPTION

Figure 1:
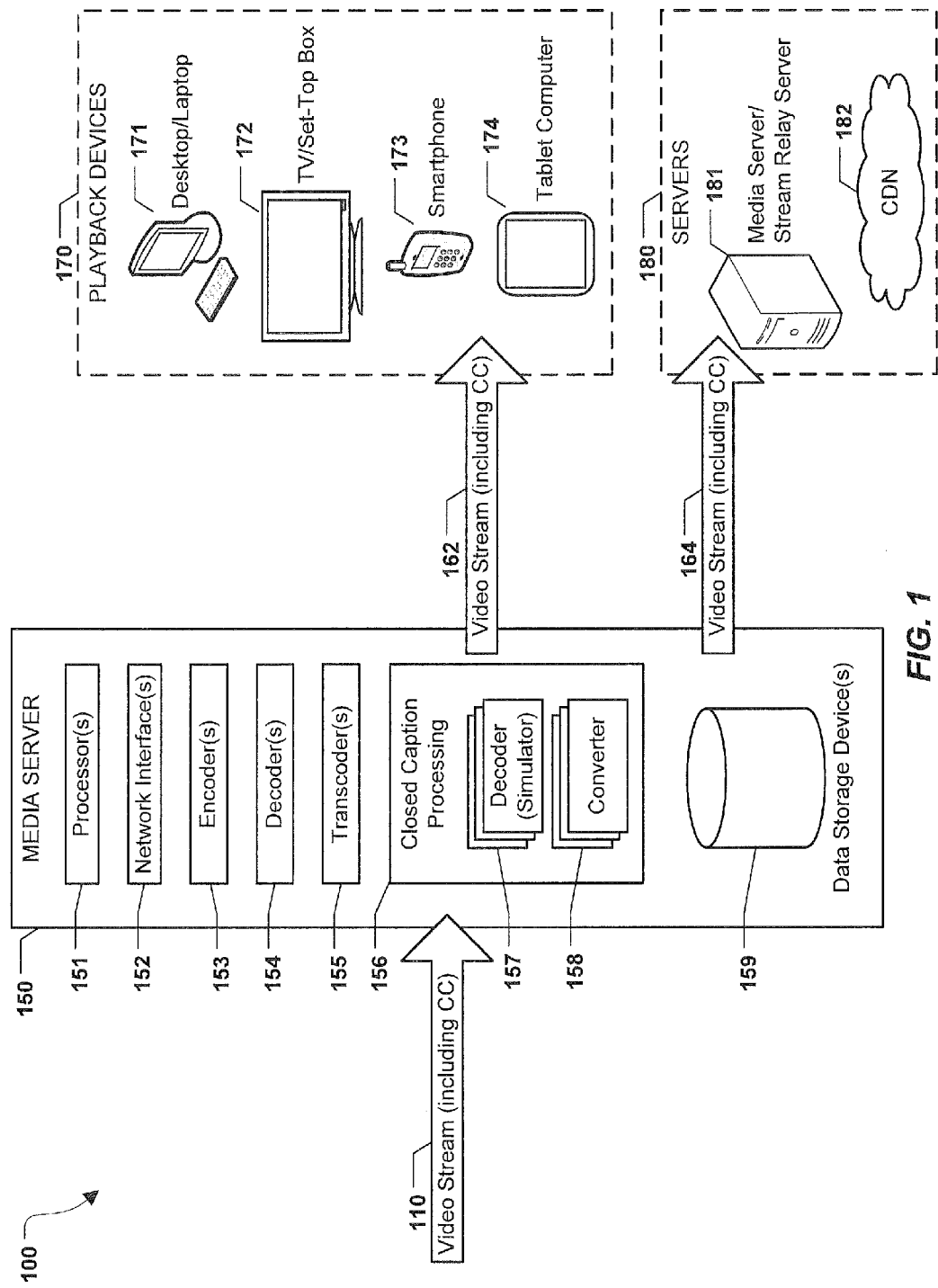
FIG. 1 is a block diagram of a particular embodiment of a system including a media server that is operable to decode and convert closed captions.

FIG. 1 is a diagram to illustrate a particular embodiment of a system 100 including a media server 150 that is operable to decode and convert closed captions. The media server 150 is configured to send and receive data from various other devices (e.g., via a network, such as a local area network (LAN) or the Internet). For example, the media server 150 may communicate with one or more playback devices 170 (e.g., devices that are configured to stream video content) and one or more other servers 180.

Although one or more embodiments herein are described with reference to closed captioning (e.g., text intended for the hearing impaired, and therefore including transcriptions of sounds, such as "wind howls" or "knocking on door"), the embodiments may also be used with subtitles (e.g., written translations of dialogue being spoken). Moreover, embodiments described herein may also be used to process and deliver "open" captioning (i.e., captions that appear "hard-coded" into a video stream and therefore cannot be selectively disabled like closed captioning).

The media server 150 may include one or more processors 151 and various components that are executable by the processor(s) 151. The media server 150 may correspond to or include software application(s) that perform media serving or processing, hardware systems (e.g., servers) that support or perform media serving and processing, or any combination thereof. Thus, various operations described with reference to the media server 150, or components thereof, may be implemented using hardware, software (e.g., instructions executable by the processor(s) 151), or any combination thereof.

The media server 150 may include one or more network interfaces 152. For example, the network interface(s) 152 may include input interface(s) and output interface(s) that are configured to receive data and to send data, respectively. In a particular embodiment, the network interface(s) 152 may be wired and/or wireless interfaces that enable the media server 150 to communicate data via a network, such as the Internet. For example, the network interface(s) 152 may include an Ethernet interface, a wireless interface compatible with an Institute of Electrical and Electronics Engineers (IEEE) 802.11 (e.g., Wi-Fi) protocol, or other wired or wireless interfaces.

The network interface(s) 152 may be configured to receive one or more streams, such as an illustrative video stream 110 that includes embedded closed caption (CC) data. The video stream 110 may correspond to a live stream. The CC data may be a part of video content or may be separate from the video content (e.g. the CC data may have a separate program identifier (ID) or may be part of a separate stream).

The network interface(s) 152 may be configured to transmit one or more streams, such as an illustrative video stream 162 or an illustrative video stream 164. Each of the video streams 162, 164 may include embedded closed captioning. The network interface(s) 152 may be configured to transmit one or more video streams (e.g., the video stream 162) to the one or more playback devices 170 (e.g., a smartphone, a tablet computer, a laptop computer, a desktop computer, a set-top box, a television, a portable media player, a game console, etc.). In the embodiment of FIG. 1, the playback devices 170 include a desktop/laptop computing device 171, a television (TV)/set-top box 172, a smartphone 173, and a tablet computer 174. The network interface(s) 152 may also be configured to transmit one or more video streams (e.g., the video stream 164) to the one or more other servers 180 (e.g., a media server, a stream relay server, a server of a content distribution network (e.g., an edge server), etc.). In the embodiment of FIG. 1, the other servers 180 include a media server/stream relay server 181 and a server of a content distribution network (CDN) 182. The video streams 110, 162, 164 may be associated with the same encoding format and transmission protocol or may be associated with different encoding formats and transmission protocols, as further described herein. In a particular embodiment, generating the video streams 162 and/or 164 includes performing video decoding, encoding, transcoding, and/or transmuxing operations at the media server 150 (e.g., to modify a video encoding format, an audio encoding format, a bitrate, an aspect ratio, packaging, etc. relative to the incoming video stream 110). In a transmuxing operation, encoded audio and video may be repackaged without modifying the encoded audio and video.

The media server 150 may include various components configured to perform stream processing functions. For example, the media server 150 may include one or more video processing components, such as encoders 153, decoders 154, and transcoders 155, each of which may be implemented using hardware, software, or both. To illustrate, one or more of the encoder(s) 153, decoder(s) 154, and transcoder(s) 155 may be implemented using Java classes (e.g., executable by a Java Virtual Machine (JVM)), C++ instructions, C instructions, etc. The decoder(s) 154 may decode data received by the media server 150. For example, the decoder(s) 154 may decode received streams (e.g., live audio-only, video-only, or audio-video streams). The encoder(s) 153 may encode data that is to be transmitted by the media server 150. The transcoder(s) 155 may be configured to perform bitrate conversion, CODEC conversion, frame size conversion, etc. Depending on a format of a received stream, a playback format supported by a requesting device, and/or transcoding parameters in use, a transcoding operation performed by the transcoder(s) 155 may trigger a decoding operation by the decoder(s) 154 and/or a re-encoding operation by the encoder(s) 153. In a particular embodiment, parameters used by the transcoder(s) 155 are stored in one or more transcoding templates at the media server 150. The encoder(s) 153, decoder(s) 154, and transcoder(s) 155 may thus enable the media server 150 to process data in accordance with multiple coding technologies and protocols.

For example, the media server 150 may support video encoding types including, but not limited to, H.264, On2 VP6, Sorenson Spark, Screen video, Screen video 2, motion picture experts group (MPEG) 2 (MPEG-2), and MPEG-4 Part 2. The media server 150 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The media server 150 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The media server 150 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The media server 150 may include one or more data storage devices 159 (e.g., random access memory (RAM), disk-based storage, etc.). The data storage device(s) 159 may store stream data (e.g., frames of a live video stream), files, closed caption data, images (e.g., to be overlaid on top of a video stream), and other data, as further described herein.

The media server 150 may include various components configured to perform closed caption processing functions. For example, the media server 150 may include a closed caption processing module 156. The closed caption processing module 156 may include one or more closed caption decoders 157 and one or more closed caption format converters 158, each of which may be implemented using hardware, software, or both. For example, one or more of the closed caption decoder(s) 157 and the closed caption format converter(s) 158 may be implemented using Java classes (e.g., executable by a Java Virtual Machine (JVM)), C++ instructions, C instructions, etc.

The closed caption decoder(s) 157 may extract and decode closed captions embedded in received streams (e.g., the video stream 110) and files. The closed captions may be represented in a first format (e.g., a first platform-specific format). The closed caption format converter(s) 158 may convert the decoded closed captions into a platform-independent format (e.g., a timed text representation). An example of a platform-independent format for closed captions is further described with reference to FIG. 3. The data in the platform-independent format may be converted into a desired output format that is compatible with a streaming protocol to be used to deliver the closed captions (and video stream) from the media server 150 to a destination device. The closed caption decoder(s) 157 and closed caption format converter(s) 158 may thus enable the media server 150 to process closed captions in accordance with multiple closed captioning standards and streaming protocols.

For example, closed caption formats may include embedded formats and file formats. The embedded formats may include, but are not limited to, action message format (AMF) on TextData events, consumer electronics association (CEA)-608, CEA-708, motion pictures expert group (MPEG)-4 part 17, 3rd generation partnership project (3GPP) timed text, digital video broadcasting (DVB) subtitling, sistema brasileiro de televisao digital (SBTVD), digital terrestrial multimedia broadcast (DTMB), and world system teletext (WST). The file formats may include, but are not limited to, scenarist closed captioning (SCC), timed text markup language (TTML), distributed format exchange profile (DFXP), society of motion picture and television engineers (SMPTE) timed text (SMPTE-TT), web video text tracks (WebVTT), SubRip (SRT), synchronized accessible media interchange (SAMI), European broadcasting union (EBU)-STL, and EBU timed text (EBU-TT). In a particular embodiment, the video stream 110 includes CEA-608 format closed captions that are interpreted by the decoder(s) 157 and the video streams 162, 164 include AMF on TextData events generated by the converter(s) 158 based on the output of the decoder(s) 157.

During operation, the media server 150 may receive the video stream 110 including closed captions. The closed caption decoder(s) 157 may extract and decode the closed captions from the video stream 110 to generate interpreted closed caption data, as further described with reference to FIG. 2. One or more of the closed caption format converter(s) 158 may receive (or access) decoded closed captions generated by the closed caption decoder(s) 157. The closed caption format converter(s) 158 may convert the decoded closed captions into the platform-independent format. The closed caption data in the platform-independent format may be stored in memory at the media server 150 (e.g., in the data storage device(s) 159). The stored platform-independent closed caption data may be used to generate closed captions in one or more output protocols for transmission to one or more destination devices. For example, when closed captions are requested by a particular destination device, the converter(s) 158 may generate closed captions in a format that is compatible with the requesting destination device.

Closed caption processing may be performed in response to a request from one of the playback devices 170 for closed captions associated with the video stream 162, which is being generated by the media server 150 based on the video stream 110 and being transmitted by the media server 150 in accordance with a particular outbound streaming protocol. For example, a user at a destination device may elect to turn on closed captions for a live video stream that the user is viewing. In a particular embodiment, the request may also specify a desired language for the closed captions. The media server 150 may support dynamically switching the closed caption language being provided to the destination device, without interruption of the video stream 162, when multiple languages are available in the received stream 110. In a particular embodiment, when multiple closed caption languages are available, closed captions in each of the languages are provided to a destination device. Alternately, a single (e.g., default) language may be provided until a different language is requested.

In response to a request for closed captions, and without interruption of the video stream 162, the media server 150 may load the closed caption decoder(s) 157 to extract and decode the closed captions and load the closed caption format converter(s) 158 to convert interpreted closed captions into the platform-independent format and from the platform-independent format into an output format compatible with the destination device. When additional destination devices associated with additional output formats request the closed captions, additional converters 158 may be loaded. In a particular embodiment, closed captions of one or more closed caption feeds may be decoded, converted, and/or transmitted. For example, closed captions of a closed caption feed corresponding to the desired language may be transmitted to the destination device. In a particular embodiment, a requested closed caption format may be specified by a playback device in a request to turn on closed captions. Thus, receiving, extracting, decoding (e.g., interpreting), converting, and transmitting of closed captions may be performed during a single live video streaming session.

The system 100 of FIG. 1 may thus enable dynamic, receipt, decoding, conversion, and transmission of closed captioning data. For example, the media server 150 may receive a live video stream with embedded closed captions in CEA-608 format and may provide AMF on TextData format closed captions to a destination device. Further, closed caption decoding and conversion may be performed in-memory using software components, without use of dedicated hardware closed caption decoders at the media server 150. In addition, use of a platform-independent closed caption format may enable simultaneous conversion into different platform-specific output formats.

In selected embodiments, the media server 150 may decode input closed captions prior to generating the platform-independent timed text data that is used to generate output closed captions. For example, the input closed captions may be represented in a first format (e.g., CEA-608). In a particular embodiment, the video stream 110 may include one or more closed caption feeds. For example, a first closed caption feed may correspond to a first set of closed caption data (e.g., in a first language) and a second closed caption feed may correspond to a second set of closed caption data (e.g., in a second language). Each closed caption feed may be provided to a corresponding closed caption decoder 157. For example, closed caption data may be extracted from a video packet of the video stream 110. To illustrate, the media server 150 may extract the closed caption data from a supplemental enhancement information (SEI) network abstraction layer (NAL) unit of a video packet of the video stream 110.

The closed caption decoder(s) 157 may extract and decode the closed captions from the one or more closed caption feeds to generate interpreted closed caption data. For example, the closed caption decoder(s) 157 may interpret one or more commands that are included in the extracted closed caption data. In a particular embodiment, interpreting the one or more commands includes simulating (or emulating), using software executing at the media server 150, execution of the one or more commands at a hardware closed caption decoder. Simulating (or emulating) execution of closed caption commands at the media server 150 may enable the media server 150 to generate closed caption data in multiple output formats. To illustrate, the incoming closed caption data may include various commands that would result in a destination device (e.g., one of the playback devices 170) drawing characters on screen, deleting previously drawn characters on screen, etc. The incoming closed captioning data may also include commands that change decoding state/variables but do not change what is shown on screen. As described above, the media server 150 may not be a destination device. Instead, the media server 150 may advantageously convert incoming closed caption data into multiple output formats. To accomplish such format conversion, the media server 150 may interpret the commands as if the commands were being executed by a destination device. Interpretation of closed caption commands is further described with reference to FIG. 2.

Figure 2:
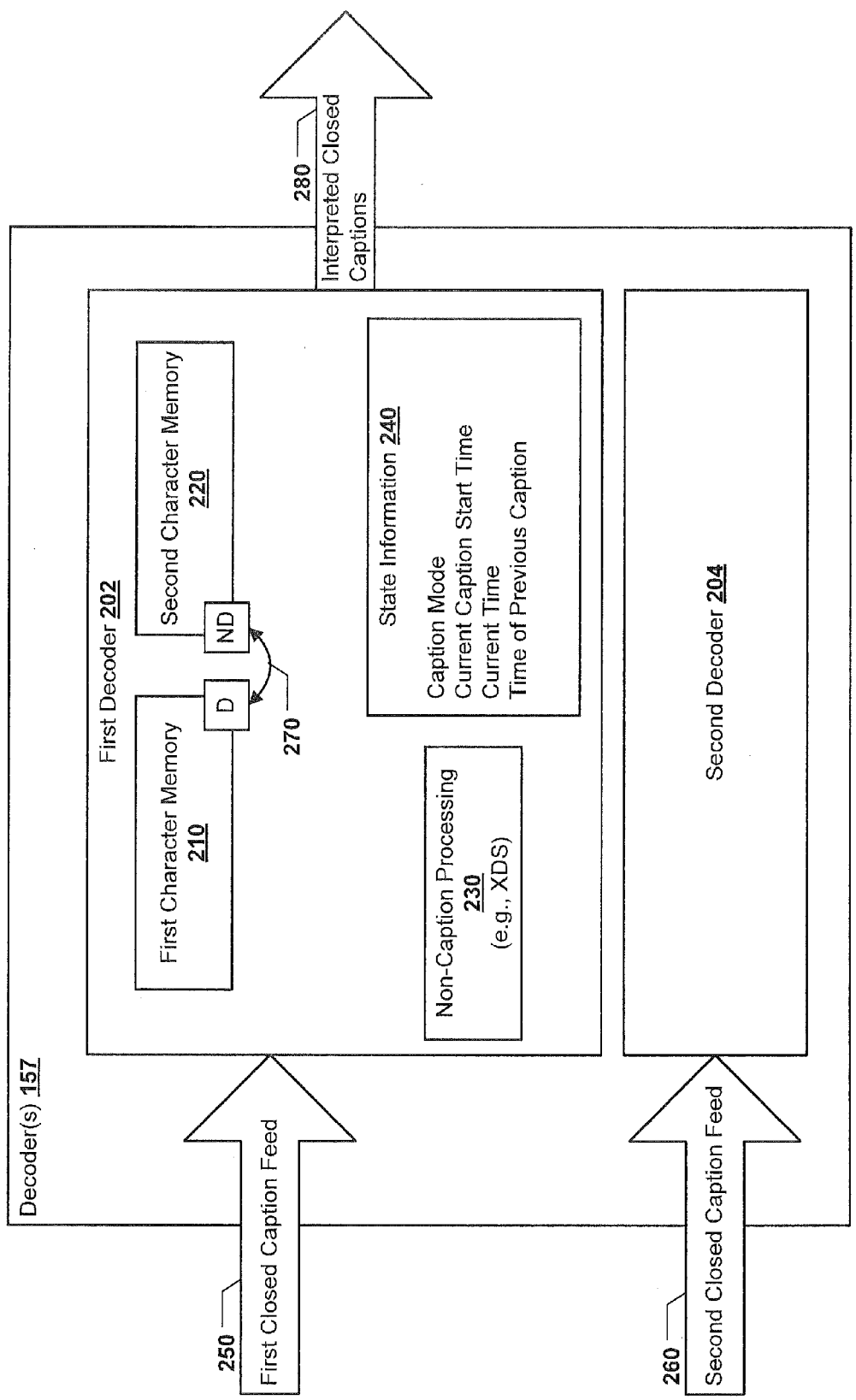
FIG. 2 is a diagram to illustrate a particular embodiment of the closed caption decoder(s) of the system of FIG. 1.

FIG. 2 is a diagram to illustrate a particular embodiment of the closed caption decoder(s) 157 of FIG. 1. In a particular embodiment, a separate decoder may be used for each closed caption feed received by the media server 150 of FIG. 1. For example, if the media server 150 is receiving N video streams and each of the video streams includes two closed caption feeds, the media server 150 may load 2N decoders (e.g., Java objects). In the example of FIG. 2, the closed caption decoder(s) 157 include a first closed caption decoder 202 for a first closed caption feed 250 and a second closed caption decoder 204 for a second closed caption feed 260.

The first closed caption decoder 202 may include a plurality of character memories (e.g., a first character memory 210 and a second character memory 220). For example, each of the character memories 210 and 220 may represent a two-dimensional (e.g., 16×32) grid for closed captioning characters. Each of the character memories 210 and 220 may be designated as "displayable" (D) or "non-displayable" (ND). A closed caption decoder may include one or more displayable (e.g., on-screen) character memories and zero or more non-displayable (e.g., off-screen) character memories. During interpretation of closed caption commands, a displayable character memory may be the target of "direct draw" commands that, when executed at a destination device (e.g., by a hardware decoder), would modify closed captions being displayed on a screen (e.g., television screen). A non-displayable character memory may be the target of "off-screen" commands that, when executed at a destination device (e.g., by a hardware decoder) would not modify the closed captions being displayed on screen. Examples of closed caption commands include, but are not limited to, a command to draw a character, move a cursor, erase a character, clear a portion of a display screen, change a text color, change a font, change a background color, or any combination thereof. In CEA-608, the displayable memory and the non-displayable memory may be "swapped" in response to a swap command. To simulate such swapping, the decoder 202 may dynamically swap the displayable and non-displayable designations, as shown at 270. Alternately, the designations may be fixed and the contents of the character memories 210 and 220 may be swapped.

The decoder 202 may also include a non-caption processing module 230 and state information 240. The non-caption processing module 230 may be used to process data that is included in the closed captioning feed 250 but is not related to closed captions. For example, in CEA-608, a closed caption feed may include non-caption data (e.g., stream metadata, digital video recorder (DVR) metadata, etc.) that corresponds to an extended data service (XDS) mode. The non-caption processing module 230 may process the non-caption data and provide access to the non-caption data via an application programming interface (API), so that an external device can access the non-caption data at the media server 150. Alternately, or in addition, the non-caption data may be injected into an outgoing stream. For example, a program description, parental rating, etc. may be captured and inserted into a stream as AMF data, ID3 tags, etc.

The state information 240 may include data that is updated during processing of closed caption data. For example, the state information 240 may indicate a caption mode. In a particular embodiment, the decoder 202 may support caption modes including, but not limited to, a pop-on mode, a roll-up mode, a direct text mode (alternately referred to as a paint-on mode), and the XDS mode.

In the pop-on mode, captions may be written to an off-screen buffer (e.g., a non-displayable character memory) and may then be swapped onto the screen all at once. Thus, from the perspective of a viewer, the pop-on mode may be used to initiate display of multiple lines of closed captioning at the same time. In the roll-up mode, a particular number of closed captioning lines (e.g., two, three, or four lines) may be available. When a new line is added to the bottom, the remaining lines may "roll up" towards the top line and the top line may be removed. In the direct text (paint-on) mode, individual characters may be inserted onto the screen at individual locations (e.g., <X,Y> coordinates).

The state information 240 may also indicate a current caption start time, a current time, and a time of a previously received caption. The times may be determined based on timecodes included in a video stream (e.g., the received video stream 110 of FIG. 1). For example, if the current caption being processed is "ABC," the start time may correspond to the time that the "A" character was received. The current time may correspond to a current stream timecode and may be updated (e.g., incremented) as additional packets of the video stream are processed. The time of the previous caption may correspond to the timecode for which a caption was last generated by the decoder 202.

Although not shown in FIG. 2, the second decoder 204 may include similar components as the first decoder 202. In a particular embodiment, one or more of the components described as being included within the decoders 202, 204 may be optional.

During operation, the closed caption decoder(s) 157 may receive closed caption feed(s). For example, the first closed caption decoder 202 may receive the first closed caption feed 250 and the second closed caption decoder 204 may receive the second closed caption feed 260. The first closed caption decoder 202 may extract closed caption data from the first closed caption feed 250 and the second caption decoder 204 may extract closed caption data from the second closed caption feed 260.

The first closed caption decoder 202 may interpret commands included in the extracted closed caption data to generate interpreted closed caption data 280. A particular example of a method of interpreting closed caption commands is further described with reference to FIGS. 4-5. Interpretation of the closed caption commands may include modifying the first character memory 210, modifying the second character memory 220, modifying the state information 240, providing non-caption data to the non-caption processing module 230, swapping the designation of displayable and non-displayable memories, etc.

When the first decoder 202 detects an end of caption, the first decoder 202 may retrieve characters stored in the first character memory 210 and/or the second character memory 220 to generate the interpreted closed caption data 280 that is provided to a format converter (e.g., the converters 158 of FIG. 1) for conversion to a platform-independent format, such as the platform-independent format described with reference to FIG. 3. An end of caption may be detected in various ways. For example, a closed caption command may explicitly designate an end of caption. As another example, in the roll-up mode, a carriage return character may designate an end of caption. As yet another example, a change from a first closed captioning mode to a second closed captioning mode may designate an end of caption. The particular event or combination of events that indicates an end of caption may depend on the incoming closed caption format.

In a particular embodiment, an end of caption is inferred if a threshold amount of time (e.g., idle time) has elapsed since the last complete caption was received. For example, with respect to the state information 240, if the difference between the current time and the time of the previous caption exceeds a threshold amount of time, the first decoder 202 may infer an end of caption and flush the character memories 210 and/or 220 to generate the interpreted closed caption data 280. In a particular embodiment, the threshold amount of time is configurable by a user. For example, the threshold amount of time may be 250 milliseconds. Use of the threshold idle time may prevent errors in situations where a caption is not finished for a long period of time (e.g., because the received video stream is corrupted). Without the use of the threshold idle time, captions may appear in an output stream later than expected (e.g., a caption was scheduled to appear before a commercial break but appears after the commercial break).

The interpreted closed caption data 280 may be converted into the platform-independent format and may be used to generate one or more sets of closed captions in platform-specific output formats. For example, if a destination device supports AMF on TextData events, the platform-independent captions may be converted into AMF on TextData events and inserted into an output video stream at the appropriate timecodes. In a particular embodiment, the incoming closed captions may be embedded in a live video stream. It should be noted that input formats other than CEA-608 may be supported. For example, closed captions in CEA-708, DVB, and other formats may also be decoded. In a particular embodiment, to support processing of DVB closed captions, the decoders 202, 204 and/or the media server 150 may include an optical character recognition (OCR) module that is configured to generate closed caption data by performing an OCR process on stream data (e.g., video data). Further, output formats other than AMF on TextData may be supported. For example, output closed captions may be represented in WebVTT format, smooth streaming format, and other formats.

While the first decoder 202 processes the first feed 250, the second decoder 204 may simultaneously or concurrently process the second feed 260. The closed caption decoders 202, 204 of FIG. 2 may thus enable simultaneous real-time (or near-real time) decoding of multiple closed caption feeds received in a video stream. Further, the decoders 202, 204 may provide interpreted closed caption data to format convert(s) for real-time (or near real-time) generation of closed captions in multiple desired output formats for streaming to destination devices via various streaming protocols (e.g., HLS, RTMP, HDS, etc.).

FIG. 3 is a diagram to illustrate a particular embodiment of a platform-independent closed captioning format that may be used by the system 100 of FIG. 1, and is generally designated 300.

In FIG. 3, the platform-independent closed captioning data includes a first segment 310 of timed text and a second segment 320 of timed text. Each of the segments 310, 320 may include a segment number 331, text 332, a start time 333, an end time 334, a language identifier 335, or any combination thereof. The segments 310, 320 may also include layout information, such as a location 336 (e.g., <X,Y> coordinates). The segments 310, 320 may further include style information, such as a font 337, a font size 338, a style 339, a background color 340, a foreground color 341, or any combination thereof. In selected embodiments, one or more of the data items illustrated in FIG. 3 may be optional. For example, layout information, font information, style information, etc. may be optional. Moreover, one or more of the data items may be indicated as applicable to only a subset of closed captioning data. For example, in a caption "ABC DEF", "ABC" may be blue and bold and "DEF" may be red and italicized. In addition, various formats and values shown in FIG. 3 (e.g., time being represented in H:MM:SS.sss format, location being represented as an <X,Y> pair, the font "Proportional Sans Serif," the color "Black," the color "White," the style "Italics," etc.) are for illustration only. Alternate embodiments may use different formats and values (e.g., named definitions or enumerated data types).

In a particular embodiment, the segments 310, 320 may also include passed-through data 342. The passed-through data may represent closed captioning data or parameters that are left unmodified by a closed caption decoder (e.g., the closed caption decoder(s) 157 of FIG. 1) and by a closed caption format converter (e.g., the closed caption format converter(s) 158 of FIG. 1) when converting closed captioning data from an input format into the platform-independent format. The passed-through data 342 may thus represent a tunneling mechanism through a media server (e.g., the media server 150 of FIG. 1) for platform-specific captioning data. A converter (e.g., the closed caption format converter(s) 158 of FIG. 1) may use the passed-through data 342 when generating closed captioning data compatible with a specific output format or protocol. Alternately, the converter may leave the passed-through data 342 unmodified, so that a media player of a destination device receives and can act on the passed-through data 342. In a particular embodiment, the converter may ignore tunnel data.

Figure 4:
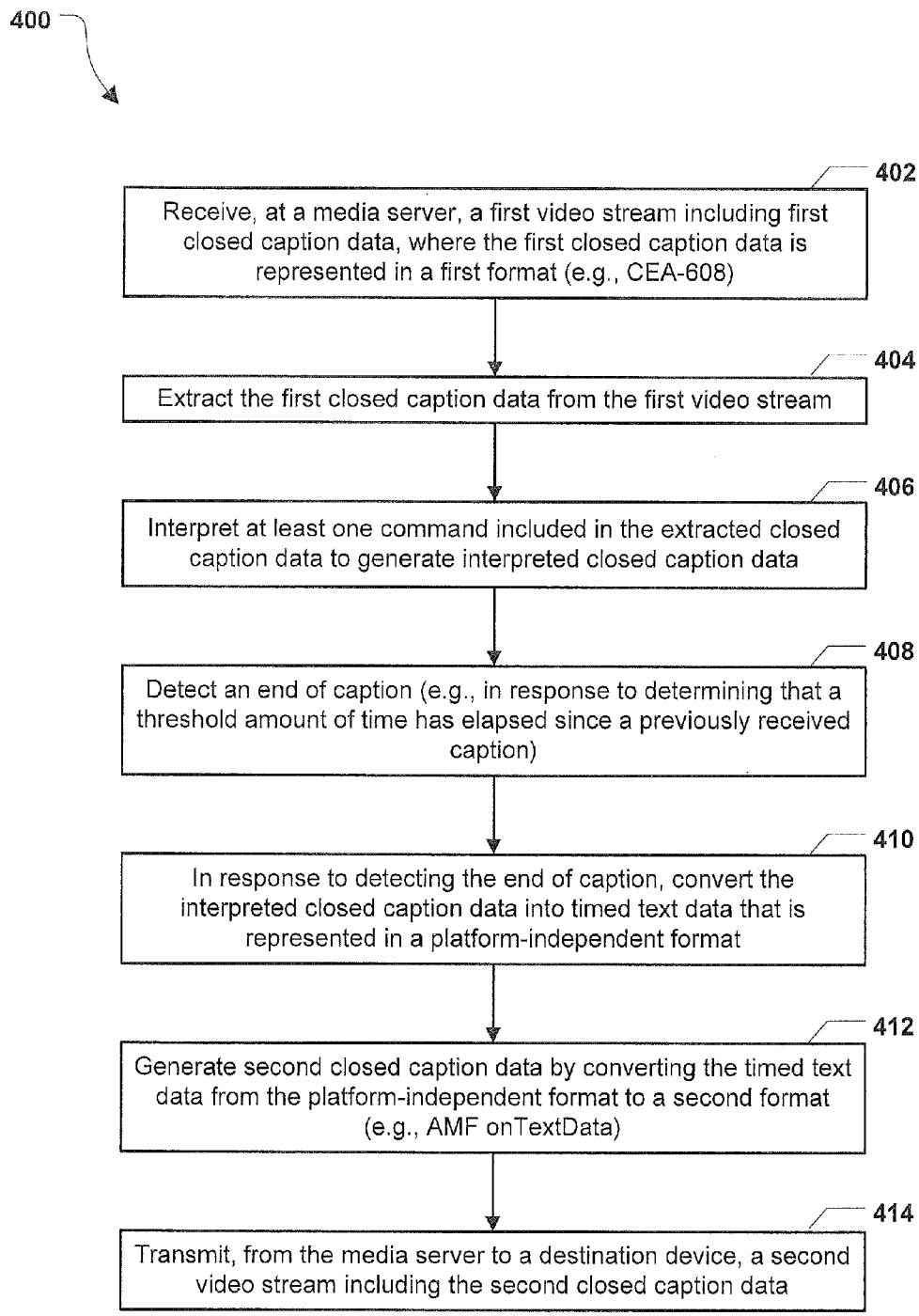
FIG. 4 is a flowchart to illustrate a particular embodiment of a method of decoding closed captions.

FIG. 4 is a flowchart to illustrate a particular embodiment of a method 400 of decoding closed captions. In an illustrative embodiment, the method 400 may be performed by the media server 150 of FIG. 1.

The method 400 may include receiving, at a media server, a first video stream including first closed caption data, at 402. Alternately, closed caption data may be received separately from video content. The first closed caption data may be represented in a first format (e.g., CEA-608). For example, in FIG. 1, the media server 150 may receive the video stream 110, where the video stream includes CEA-608 format closed captions.

The method 400 may also include extracting the first closed caption data from the first video stream, at 404, and interpreting at least one command included in the extracted closed caption data to generate interpreted closed caption data, at 406. For example, in FIG. 1, the decoder(s) 157 may extract closed captions from SEI NAL units of the video stream 110 and may interpret CEA-608 commands to generate interpreted closed caption data. Interpreting the CEA-608 commands may include tracking state information and modifying on-screen and off-screen character memories, as further described with reference to FIGS. 5-6. In a particular embodiment, when closed caption data is not embedded within a video stream (e.g., closed caption data is stored in a separate file or included in a separate stream), extraction may not be performed.

The method 400 may further include detecting an end of caption, at 408. In a particular embodiment, the end of caption may be detected based on a threshold amount of time (e.g., 250 ms) having elapsed since a previously received caption. Alternately, the end of caption may be determined based on the interpreted command (e.g., an end of caption command, a command that switches closed caption modes, a command that inserts a carriage return, etc.). The method 400 may include, in response to detecting the end of caption, converting the interpreted closed caption data into timed text data that is represented in a platform-independent format, at 410. For example, in FIG. 1, the converter(s) 158 may convert the interpreted closed caption data generated by the decoder(s) 157 into a platform-independent format (e.g., the format of FIG. 3).

The method 400 may include generating second closed caption data by converting the timed text data from the platform-independent format to a second format, at 412, and transmitting from the media server to a destination device a second video stream including the second closed caption data, at 414. In a particular embodiment, the second format may be AMF on TextData. For example, in FIG. 1, the converter(s) 158 may generate closed captions that are embedded into the outgoing video streams 162 and/or 164. The method 400 of FIG. 4 may thus enable real-time or near-real time interpretation and format conversion of closed captions.

Figure 5:
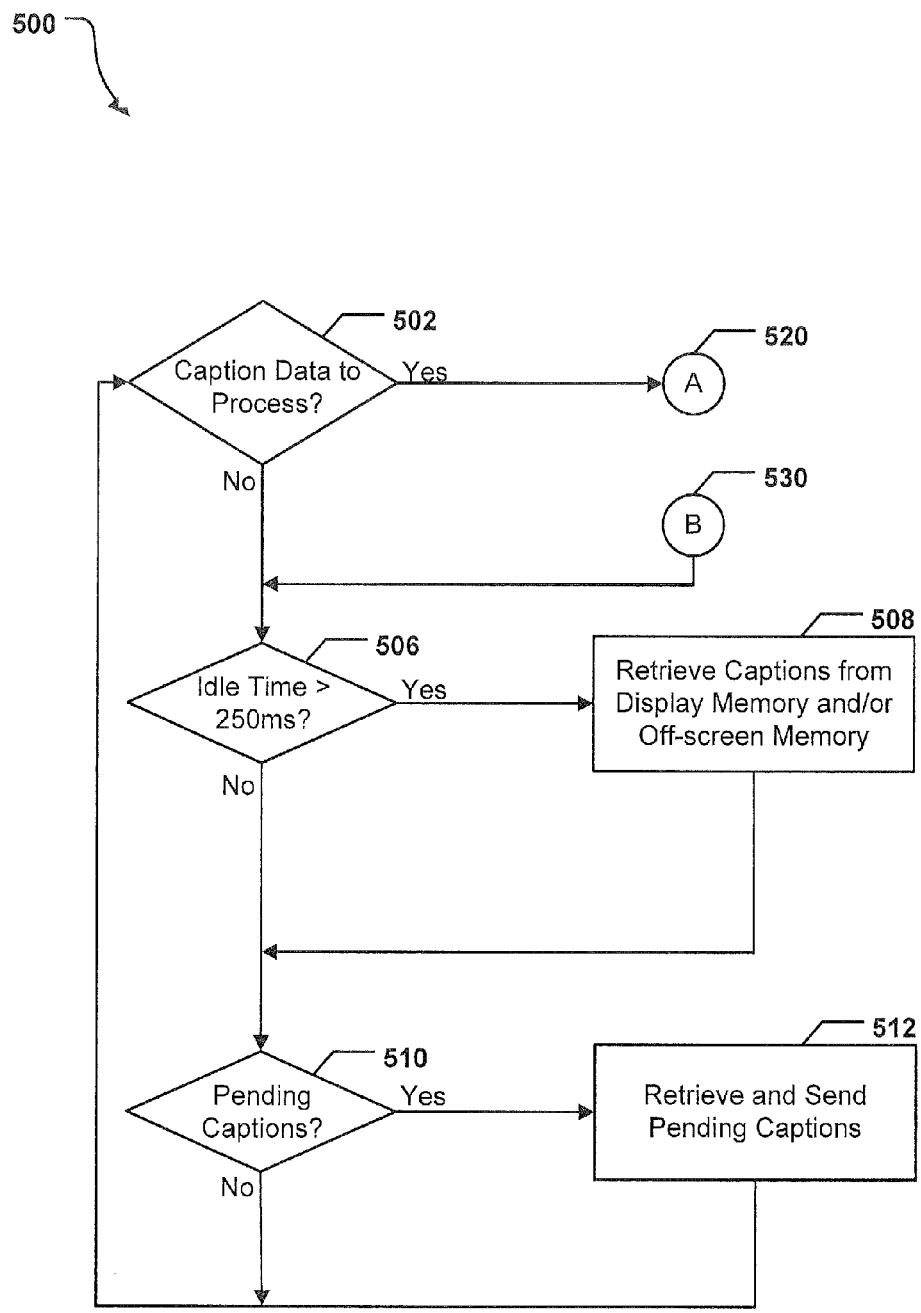
FIGS. 5-6 depict a flowchart to illustrate another particular embodiment of a method of decoding closed captions.
Figure 6:
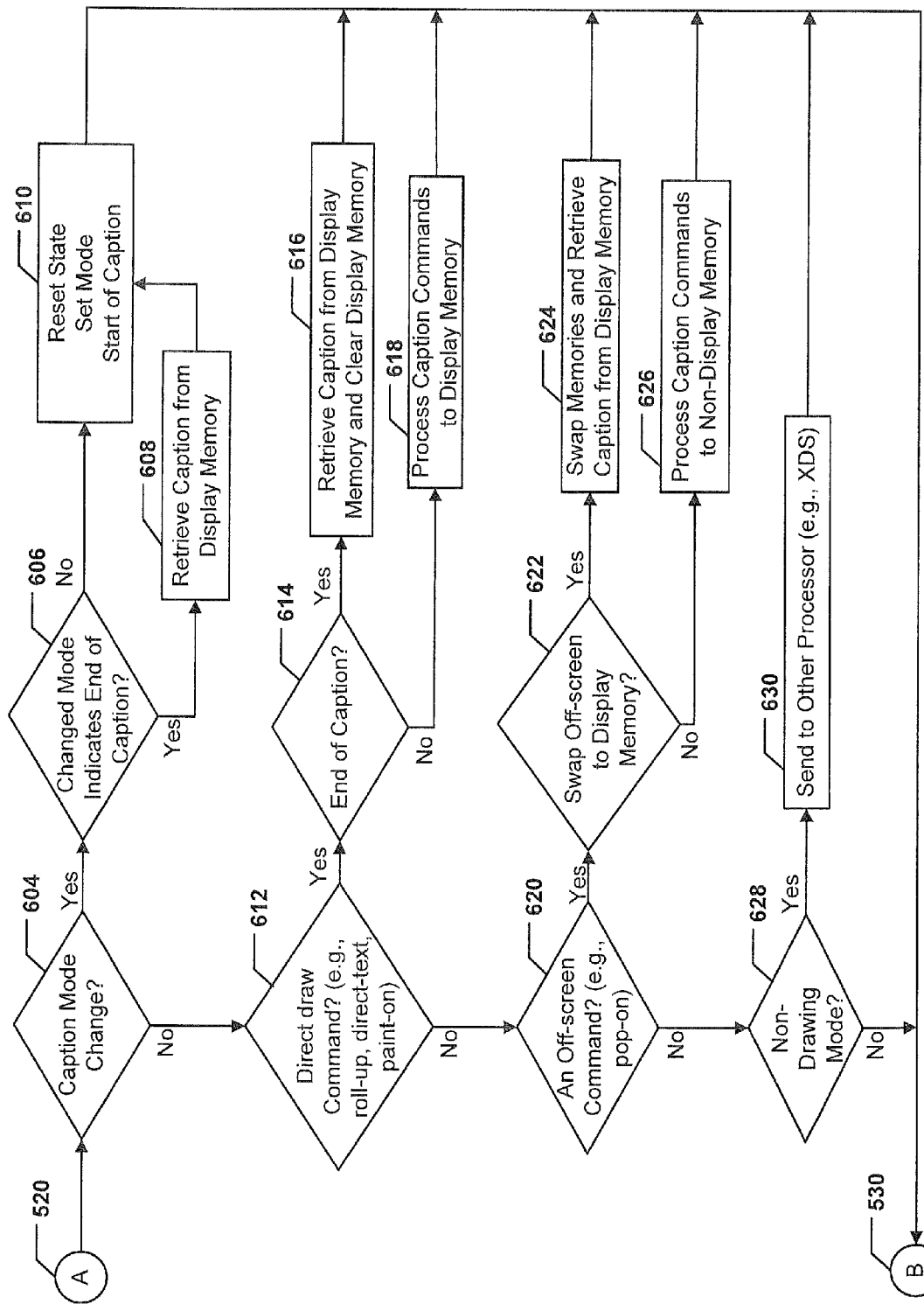

FIGS. 5-6 depict a flowchart to illustrate another particular embodiment of a method 500 of decoding closed captions. In an illustrative embodiment, the method 500 may be performed by the media server 150 of FIG. 1.

The method 500 may include determining whether a stream or file includes additional caption data to process, at 502. When there is additional caption data to process, the method 500 may advance to A, at 520, and may continue on FIG. 6. Turning to FIG. 6, the method 500 may include determining whether a closed caption command indicates a caption mode change, at 604. When a caption mode change is detected, the method 500 may include determining whether the mode change indicates an end of caption, at 606. When the mode change indicates an end of caption, the method 500 may include retrieving a caption from a display memory (e.g., a character memory indicated as displayable), at 608, and resetting state information, setting a new mode, and setting a start of caption timecode, at 610. When the mode change does not indicate an end of caption, the method 500 may advance to 610 without retrieving a caption from memory. From 610, the method 500 may advance to B, at 530, and may continue on FIG. 5.

When it is determined, at 604, that the command does not indicate a caption mode change, the method 500 may include determining whether the command is a direct draw command, at 612. For example, a direct draw command may be a command that modifies display memory during roll-up mode or direct text (paint-on) mode. When the command is a direct draw command, the method 500 includes determining whether the command indicates an end of caption, at 614. For example, in roll-up mode, a command including a carriage return may indicate an end of caption. When the command indicates an end of caption, the method 500 may include retrieving a caption from display memory and clearing the display memory, at 616, and advancing to B, at 530. Certain caption state information (e.g., a caption start time and a time of previous caption) may also be updated. When the command does not indicate an end of caption, the method 500 may include processing the command and updating a display memory, at 618, and advancing to B, at 530.

When the command is not a direct draw command, the method 500 may include determining whether the command is an off-screen command, at 620. For example, an off-screen command may modify an off-screen (e.g., non-displayable) memory during pop-on mode. When the command is an off-screen command, the method 500 may include determining if the command is a swap command, at 622. When the command is a swap command, the method 500 may include swapping the on-screen and off-screen memories and retrieving a caption from the on-screen memory, at 624, and advancing to B, at 530. For example, swapping may be performed as described with reference to the swap 270 of FIG. 2. When the command is not a swap command, the method 500 may include processing the command and updating the off-screen memory, at 626, and advancing to B, at 530.

When the command is not an off-screen command, the method 500 may include determining whether the command is associated with a non-drawing mode (e.g., XDS mode), at 628. When the command is associated with a non-drawing mode, the method 500 may include sending the command to another processor (e.g., an XDS processor, such as the non-caption module 230 of FIG. 2), at 630, and advancing to B, at 530. When the command is not associated with a non-drawing mode, the method 500 may include advancing to B, at 530.

Returning to FIG. 5, when it is determined, at 502, that there is no caption data be processed, or when the method 500 advances to B, the method 500 may include determining whether an idle time has exceeded a threshold amount of time, at 506. For example, the threshold amount of time may be 250 ms and the idle time may be a difference between a current time and a time that a previous caption was received. When the idle time exceeds the threshold amount of time, the method 500 may include retrieving captions from display memory and/or off-screen memory, at 508, and advancing to 510. When the idle time does not exceed the threshold, the method 500 may include determining whether pending captions are stored (e.g., cached) at the decoder, at 510. When pending captions are stored at the decoder, the method 500 may retrieve and send the pending captions (e.g., to a format converter), at 512. The method 500 may return to 502 and may repeat while additional packets of the video stream are received at the media server 150.

It should be noted that the order of steps illustrated in the flowcharts of FIGS. 4-6 are to be considered illustrative, not limiting. In alternate embodiments, the order of steps may be different. Further, one or more steps may be optional and/or replaced by other steps. In addition, one or more steps may be consolidated. For example, with respect to FIG. 6, some decoders may perform non-drawing mode operations first, then off-screen operations, and then direct draw operations. Further, some decoders may not perform a swap between on-screen and off-screen memories, and may instead use other methods to move off-screen data to on-screen memory. For, example, instead of swapping, a decoder may copy data from off-screen memory to on-screen memory.

Although one or more embodiments described with reference to FIGS. 1-6 illustrate processing of closed captions for live streams, the media server 150 of FIG. 1 may also decode closed captions for non-live streams, such as video on demand streams. As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device (e.g., a data storage device 159 of the media server 150 or a data storage device remote to the media server 150). Closed captions for the VOD stream may be stored as part of the VOD file or separately (e.g., in a separate file). A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). Thus, the closed caption decoders 202, 204 of FIG. 2 may be used to interpret closed captions that are included in (or provided separately from) a VOD stream or a DVR stream.

In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the media server 150 of FIG. 1, the desktop/laptop computing device 171 of FIG. 1, the TV/set-top box 172 of FIG. 1, the smartphone 173 of FIG. 1, the tablet computer 174 of FIG. 1, the media server/stream relay server 181 of FIG. 1, a server (e.g., edge server) of the CDN 182 of FIG. 1, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a non-transitory computer-readable or a processor-readable medium. The terms "computer-readable medium" and "processor-readable medium" include a single medium or multiple media, such as a centralized or distributed database, and/or associated caches and servers that store one or more sets of instructions. The terms "computer-readable medium" and "processor-readable medium" also include any medium that is capable of storing a set of instructions for execution by a processor or that cause a computer system to perform any one or more of the methods or operations disclosed herein. For example, a computer-readable or processor-readable medium or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage medium or device.

In a particular embodiment, a method includes receiving, at a media server, a first video stream and first closed caption data associated with the first video stream. The method also includes interpreting at least one command included in the first closed caption data to generate interpreted closed caption data. The method further includes transmitting, from the media server to a destination device, a second video stream including second closed caption data that is generated based on the interpreted closed caption data.

In another particular embodiment, an apparatus includes a processor and a network interface configured to receive, at a media server, a first video stream and first closed caption data associated with the first video stream. The apparatus also includes a closed caption decoder executable by the processor to interpret at least one command included in the first closed caption data to generate interpreted closed caption data. The network interface is further configured to send, from the media server to a destination device, a second video stream including second closed caption data that is generated based on the interpreted closed caption data.

In another particular embodiment, a computer-readable storage device stores instructions that, when executed by a computer, cause the computer to receive, at a media server, a first video stream and first closed caption data associated with the first video stream, wherein the first closed caption data is represented in a first format. The instructions are also executable by the computer to interpret at least one command included in the first closed caption data to generate interpreted closed caption data. The instructions are further executable by the computer to detect an end of caption in response to determining that a threshold amount of time has elapsed since a previously received caption. The instructions are executable by the computer to, in response to detecting the end of caption, convert the interpreted closed caption data to timed text data represented in a platform-independent format. The instructions are also executable by the computer to generate second closed caption data by converting the timed text data from the platform-independent format to a second format and to transmit, from the media server to a destination device, a second video stream including the second closed caption data.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An apparatus comprising:
   a processor;
   a network interface to receive, at a media server, a first video stream and first closed caption data associated with the first video stream;
   a memory storing state information indicating an incrementally updated processing time and a time of a previously received caption; and
   a closed caption decoder executable by the processor to:
      interpret at least one command included in the first closed caption data to generate interpreted closed caption data;
      detect an end of caption in response to determining that a difference between the processing time and the time of the previously received caption exceeds a threshold amount of time; and
      generate second closed caption data based on the interpreted closed caption data in response to detecting the end of caption, wherein the network interface is further to send, from the media server to a destination device, a second video stream including the second closed caption data.

2. The apparatus of claim 1, wherein the second closed caption data is sent in accordance with action message format (AMF) on TextData, web video text tracks (WebVTT), smooth streaming, or any combination thereof.

3. The apparatus of claim 1, wherein the closed caption decoder is further executable by the processor to detect an end of a first caption in response to:
- determining that a particular command in data corresponding to the first caption indicates a change from a first closed captioning mode of a plurality of closed captioning modes to a second closed captioning mode of the plurality of closed captioning modes,
- determining that the particular command includes a carriage return, is an end of caption command, or a combination thereof,
- determining that the threshold amount of time has elapsed since a previously received second closed caption,
- or any combination thereof.

4. The apparatus of claim 3, wherein the plurality of closed captioning modes includes a pop-on mode, a roll-up mode, a direct text mode, a paint-on mode, an extended data service (XDS) mode, or any combination thereof.

5. The apparatus of claim 1, wherein the first closed caption data is represented in a first format and further comprising a converter executable by the processor to:
- convert the interpreted closed caption data to timed text data represented in a platform-independent format; and
- generate the second closed caption data by converting the timed text data from the platform-independent format to a second format.

6. The apparatus of claim 1, wherein the closed caption decoder comprises:
- a first character memory;
- a second character memory, wherein one of the first character memory and the second character memory is designated as displayable and the other of the first character memory and the second character memory is designated as non-displayable; and
- a non-caption module executable by the processor to process non-caption data received via the first video stream.

7. The apparatus of claim 1, wherein the state information further indicates a caption mode and a caption start time.

8. A computer-readable storage device storing instructions that, when executed by a processor, cause the processor to:
- receive, at a media server, a first video stream and first closed caption data associated with the first video stream;
- interpret at least one command included in the first closed caption data to generate interpreted closed caption data;
- detect an end of caption in response to determining that a threshold amount of time has elapsed since a previously received caption;
- in response to detecting the end of caption, generate second closed caption data based on the interpreted closed caption data; and
- transmit, from the media server to a destination device, a second video stream including the second closed caption data.

9. A method comprising:
- receiving, at a media server, a first video stream and first closed caption data associated with the first video stream;
- interpreting at least one command included in the first closed caption data to generate interpreted closed caption data;
- detecting an end of caption in response to determining that a threshold amount of time has elapsed since a previously received caption;
- in response to detecting the end of caption, generating second closed caption data based on the interpreted closed caption data; and
- transmitting, from the media server to a destination device, a second video stream including the second closed caption data.

10. The method of claim 9, wherein interpreting the first closed caption data comprises simulating a hardware closed caption decoder using software executed by the media server.

11. The method of claim 9, wherein the first closed caption data is represented in a first format and further comprising:
- converting the interpreted closed caption data to timed text data represented in a platform-independent format; and
- generating the second closed caption data by converting the time text data from the platform-independent format to a second format.

12. The method of claim 11, wherein the first format comprises consumer electronics association (CEA)-608 format, CEA-708, digital video broadcasting (DVB), or any combination thereof.

13. The method of claim 11, further comprising:
- loading a first converter that is compatible with the first format to convert the first closed caption data from the first format to the platform independent format;
- receiving third closed caption data associated with the first video stream, wherein the third closed caption data is represented in a third format; and
- loading a second converter that is compatible with the third format to convert the third closed caption data from the third format to the platform-independent format.

14. The method of claim 9, further comprising performing an optical character recognition (OCR) process on video data to generate the first closed caption data.

15. The method of claim 9, wherein the threshold amount of time is approximately 250 milliseconds.

16. The method of claim 9, wherein the threshold amount of time is configurable by a user.

17. The method of claim 9, wherein the at least one command includes a command to draw a character, move a cursor, erase a character, clear a portion of a display screen, change a text color, change a font, change a background color, or any combination thereof.

18. The method of claim 9, further comprising maintaining a first character memory and a second character memory, wherein the first character memory is designated as displayable and the second character memory is designated as non-displayable.

19. The method of claim 18, further comprising:
- when a particular command included in particular closed caption data is an off-screen command:
  - in response to determining that the particular command is not a swap command, modifying the second memory based on the particular command; and
  - in response to determining that the particular command is the swap command, designating the first character memory as non-displayable, designating the second character memory as displayable, and generating the interpreted closed caption data from the second character memory; and when the particular command is a direct draw command:
- in response to determining that the particular command designates an end of a particular caption, generating particular interpreted closed caption data from the first character memory and clearing the first character memory; and
- in response to determining that the particular command does not designate the end of the particular caption, modifying the first character memory based on the particular command.

20. The method of claim 9, wherein the first closed caption data includes non-caption data comprising a description of a video program, a parental rating associated with the video program, or a combination thereof.

* * * * *